United States Patent [19]

Lassalle

[11] Patent Number: 4,894,424

[45] Date of Patent: Jan. 16, 1990

[54] POLYMERISATION OF OLEFINS USING MODIFIED ZIEGLER-NATTA CATALYST

[75] Inventor: Dominique Lassalle, Martigues, France

[73] Assignee: BP Chemicals Limited, London, England

[21] Appl. No.: 204,984

[22] Filed: Jun. 8, 1988

Related U.S. Application Data

[63] Continuation of Ser. No. 911,472, Sep. 25, 1986, abandoned.

[30] Foreign Application Priority Data

Oct. 11, 1985 [FR] France .................. 85 15239

[51] Int. Cl.$^4$ .................. C08F 4/64; C08F 10/00
[52] U.S. Cl. .................. 526/125; 502/133; 526/138; 526/901; 526/904; 526/908; 526/909; 526/348.6; 526/352
[58] Field of Search .................. 526/124, 125

[56] References Cited

U.S. PATENT DOCUMENTS

| | | | |
|---|---|---|---|
| 4,130,699 | 12/1978 | Haff et al. | 526/84 |
| 4,136,058 | 1/1979 | Harris et al. | 526/125 |
| 4,282,341 | 8/1981 | Klaerner et al. | 526/124 |
| 4,308,361 | 12/1981 | Fujii et al. | 526/82 |
| 4,356,111 | 10/1982 | Shipley et al. | 526/114 |
| 4,511,703 | 4/1985 | Bailly | 526/142 |

FOREIGN PATENT DOCUMENTS 1298690 6/1962 France .
2019395 7/1970 France .

*Primary Examiner*—Edward J. Smith
*Attorney, Agent, or Firm*—Brooks Haidt Haffner & Delahunty

[57] ABSTRACT

The present invention relates to a process for the polymerisation or copolymerisation of alpha-olefins in the presence of a Ziegler-Natta catalyst system comprising on the one hand a catalyst solid comprising compounds of halogens, transition metals of Groups IV, V, VI of the Periodic Table of Elements, magnesium and optionally aluminum, free from a metal/carbon bond and on the other hand a catalyst consisting of organometallic compounds of metals of Group II or III of the said Table. This process is characterised in that before its use in polymerisation or copolymerisation, the catalyst solid is treated by water in a given quantity, this treatment making it possible to improve the conditions for obtaining polymers, particularly in a process of polymerisation or copolymerisation in the gas phase.

9 Claims, No Drawings

POLYMERISATION OF OLEFINS USING MODIFIED ZIEGLER-NATTA CATALYST

This application is a continuation of application Ser. No. 911,472, filed Sept. 25, 1986, now abandoned.

The present invention relates to the polymerisation or copolymerisation of alpha-olefins by means of Ziegler-Natta catalyst systems. In particular it concerns the improvement of high-activity catalysts, based on halides of transition metals, associated with magnesium compounds, by treating these catalysts with water in order to facilitate their use in processes of polymerisation or copolymerisation of alpha-olefins, especially in the gas phase.

Ziegler-Natta catalyst systems comprise two main components, frequently referred to as "the catalyst" and "the co-catalyst". The catalyst generally comprises one or more compounds of transition metals belonging to Groups IV, V or VI of the Periodic Table of Elements, and the co-catalyst generally comprises one or more organometallic compounds of metals of Groups II or III. The catalysts are generally solid anhydrous or substantially anhydrous substances comprising for example titanium halides, preferably associated with magnesium compounds, having a relatively high activity in the polymerisation of alpha-olefins, which advantageously makes it possible to avoid the need to remove catalyst residues from the polymers at the end of polymerisation. The catalysts can be supported or unsupported. Support materials can comprise, for example, magnesium halide, silica, alumina or magnesia. The co-catalysts generally consist of organoaluminium or organozinc compounds which are liquid or gaseous under the polymerisation conditions.

During the polymerisation of alpha-olefins in suspension in a liquid hydrocarbon medium or in the gas phase, the solid polymer in the course of formation develops inside and on the surface of each particle of catalyst in such a way that when the development of these particles occurs regularly, the shapes and relative sizes of the growing particles remain substantially similar and, as a result, the particle size distribution of the polymer obtained substantially corresponds to that of the catalyst.

The catalysts based on transition metal halides associated with magnesium compounds frequently possess a very broad a particle size distribution and a very high level of activity in polymerisation, which renders the polymerisation difficult to control, particularly in its initial phase. In fact, these high-activity catalysts are generally prepared either by the reduction of transition metal compounds using organomagnesium compounds, or by bringing transition metal compounds and magnesium compounds such as oxides, hydroxides, alcoholates, hydroxychlorides or chlorides of magnesium into contact with each other, this contacting being performed by techniques of precipitation, impregnation or grinding. In view of the techniques employed in their preparation, these catalysts often have a relatively broad particle size distribution, associated with a high content of fine particles. This causes problems in gas phase processes for polymerising alpha-olefins. For example, an important process for polymerising alpha-olefins in the gas phase employs a fluidised-bed reactor in which the catalyst and polymer in course of formation are maintained in the fluidised state by means of a rising gas stream comprising the alpha-olefins to be polymerised and circulating at a velocity which is sufficiently high to maintain homogenisation of the fluidised bed, and to eliminate effectively the heat given off by polymerisation reaction. The fine particles of catalyst and polymer then run the risk of being easily entrained in the gas stream, and carried over into zones not designed for continuation of the polymerisation reaction.

Moreover, these high activity catalysts generally possess a high polymerisation activity at the moment of their introduction into the polymerisation medium, which on the one hand may cause reaction runaways and on the other hand may risk fragmentation of the catalyst particles. In the case of a gas phase polymerisation process, these reaction runaways produce hot spots and may lead to the formation of agglomerates and deposition of the polymer on the walls of the reactor, thus necessitating the interruption of polymerisation.

With a view to reducing the formation of fine particles during the preparation of these high activity catalysts, a proposal has already been made to associate these catalysts with granular supports by impregnating or by precipitating the catalysts on to the supports, these latter having a narrow particle size distribution. The granular supports are generally chosen from among refractory products such as alumina and silica, or from among inert, finely divided polyolefins. However, it is known that the association of a catalyst with a granular substance is accompanied by an increase in the catalytic activity, especially in the initial phase of the polymerisation reaction. Moreover, the polymers obtained from catalysts supported on refractory products have a relatively high content of inorganic residue which can impair the quality and properties of these polymers.

The addition of small quantities of water to Ziegler-Natta type catalysts free from magnesium is already known. Such catalysts have a relatively low activity in alpha-olefin polymerisation. For example it is known that a solid titanium trichloride catalyst obtained by reducing titanium tetrachloride, can be treated with small quantities of water before its use in polymerisation. The effect of this addition of water is to eliminate the unreacted titanium tetrachloride and to increase the stereospecificity of the catalyst when it is used in the manufacture of isotactic polypropylene. The activity of this catalyst is also increased in polymerisation, the said activity nevertheless remaining comparatively low in relation to that of catalysts comprising magnesium compounds.

Another method of preparation of a catalyst of this type consists in reducing by means of an organoaluminium compound, a mixture or a product of reaction of a titanium tetrahalide, a titanium alcoholate and a vanadyl dihalide, a small quantity of water having been previously added to this mixture or this reaction product. The main effect of this addition of water is to broaden the molecular weight distribution of the polymers obtained from this catalyst, the polymerisation activity of which remains, however, comparatively low.

The addition of water to a solid catalyst consisting of phosphate derivatives of vanadium obtained by reaction between a vanadium compound and phosphoric acid is also known. This addition of water also has the effect of broadening the molecular weight distribution of the polymers obtained from this catalyst, of increasing the polymerisation activity of this catalyst and improving the conditions for obtaining polymers in suspension in a liquid hydrocarbon diluent. The polymerisation activity of this catalyst, however, remains relatively low, even after the addition of water. One variant of this method of preparation consists of impregnating a polyolefin support with an alcohol solution of the phosphate derivatives of vanadium, this support having previously been placed in contact with a small quantity of water. However, the effect of this contacting is to broaden the molecular weight distribution of the polymers produced.

The catalysts referred to above cannot be used advantageously in a gas-phase polymerisation process because their overall activity is relatively low in polymerisation and moreover it is necessary to subject the produced polymer to an operation to eliminate the catalytic residues, generally performed in the liquid phase, especially with a view to avoiding excessive colouration of the polymers.

The use of water in the preparation of high-activity catalysts of the Ziegler-Natta type and comprising in particular magnesium compounds is also known. However, in this case, the water is employed during the preparation of the catalyst and not at the end of the preparation by way of post-treatment. Thus, a catalyst preparation method is known in which water is reacted with a halogenated tetravalent titanium compound in the presence of an inert solid support material such as oxide, a hydroxide or a chloride of magnesium. The titanium compound then precipitates on to the solid substance and may then optionally be reduced by an organoaluminium compound. However, it is found that the reaction of the water with the titanium compound increases very appreciably the polymerisation activity of this catalyst, the particle size distribution of which depends largely on that of the solid support material employed.

Another catalyst preparation method is also known which consists in decomposing by means of water an organomagnesium compound, used in excess in a reduction reaction of a transition metal compound. The quantity of water used in this decomposition is generally comparatively high and depends on the excess quantity of organomagnesium compound employed in relation to the quantity of transition metal compound. The main effect of the use of water in the course of this preparation is to increase considerably the activity of this catalyst in polymerisation. Furthermore, experience shows that the particle size distribution of the catalyst is especially broadened, by reason in particular of the decomposition of the organo-magnesium compound by water.

It has now been found that it is possible to improve the performance of high activity catalysts in the polymerisation of alpha-olefins, principally based on halides of transition metals associated with magnesium compounds, with a view to adapting them in particular to polymerisation of alpha-olefins in the gas phase. The present invention relates more especially to a new method of preparation of catalysts, comprising in a first stage the preparation of a catalytic solid, then in a second stage the treatment of this catalytic solid with small quantities of water. It is found that treatment with water of this catalytic solid gives a catalyst with an overall activity which is substantially unchanged in the polymerisation of alpha-olefins, but having reduced (but not zero) activity in the initial phase of polymerisation, thus improving the initial phase of the polymerisation reaction. Moreover, it is observed that the water treatment of the catalytic solid has the effect of narrowing the particle size distribution of the polyolefins produced, especially by reducing very appreciably the content of fine particles, without this involving substantial modification of the other physical characteristics of these polyolefins, such as the molecular weight distribution.

The present invention provides a process for polymerising or copolymerising alpha-olefins in the presence of a Ziegler-Natta catalytic system comprising, as catalyst, a particulate solid material comprising compounds of at least halogen, a Group IV, V or VI transition metal and magnesium, said particulate solid material having been prepared under substantially anhydrous conditions and being substantially free from metal/carbon chemical bonds, and as co-catalyst, at least one organometallic compound of a metal belonging to Groups II or III, characterised in that prior to contacting the catalyst with the co-catalyst to form the catalytically active system, the particulate solid material is treated with from 0.1 to 5 moles of water per gram atom of transition metal present in the catalyst.

The "Groups" referred to above are Groups of the Periodic Table according to Mendeleev.

The particulate solid material and the catalyst formed therefrom by the water treatment in the present invention must contain halogen, the defined transition metal and magnesium. They may optionally contain other atoms or groups, for example aluminium in chemical combination, organic groups or organic compounds. They can comprise a support material if desired. Such support materials can be, for example, magnesium chloride, silica or alumina.

The particulate solid material to be treated with water to form the catalyst component in the present invention is an anhydrous or or substantially anhydrous solid. Preferably such solid is obtained by precipitation, impregnation or chemical reaction performed under anhydrous conditions.

A preferred particulate solid material employed in the present invention has the empirical formula:

$Mg_mAl_nM(OR_1)_pX_qD_r$ in which M is a titanium and/or vanadium atom, $R_1$ is an alkyl group comprising 2 to 14 carbon atoms, X is a chlorine and/or bromine atom, D is an electron donor compound comprising at least one atom of oxygen, or sulphur, or nitrogen or phosphorus, but not comprising an atom of active hydrogen, and wherein:

m is in the range from 1.5 to 50, preferably from 2 to 10, n is in the range from 0 to 2, preferably from 0 to 1, p is in the range from 0 to 3, q is in the range from 4 and 110, preferably from 5 to 27, and r is in the range from 0 and 60, preferably from 0 to 20.

For the avoidance of doubt, the ranges quoted throughout this specification include the end limits of each range.

The particulate solid material which is treated to form the catalyst component in the process of the present invention can be obtained by various processes in themselves known, especially those wherein a compound of magnesium such as a halide of magnesium, is crushed in the presence of at least one halogenated transition metal compound and optionally an electron donor compound, or those wherein a magnesium compound is precipitated at the same time as one or more halogenated transition metal compounds, optionally in the presence of an electron donor compound.

The particulate solid material can for example be obtained by reacting an organomagnesium compound with a halogenated compound of transition metal taken at its maximum valency in the presence of a halogenating agent, and optionally an electron donor compound D, complying with the same defined as above, chosen for example from among amines, amides, phosphines, sulphoxides, sulphones, ethers and thioethers. This reaction is advantageously performed using these compounds in quantities such that the molar ratio of the quantity of organomagnesium compound to the quantity of halogenated transition metal compound is greater than 1, the excess of organomagnesium compound being decomposed by the halogenating agent in such a manner as to leave virtually no metal/carbon bond behind.

Preferably the particulate solid material is obtained by reacting at a temperature between $-20°$ and $150°$ C., and more especially between $50°$ and $100°$ C., a halogenated compound of tetravalent titanium of the formula:

$$TiX_{4-t}(OR_1)_t$$

in which X is an atom of chlorine or bromine, $R_1$ is an alkyl group comprising from 2 to 14 carbon atoms and t is zero, fractional or integral in the range 0 and 3, and an organomagnesium compound which is a halide of alkylmagnesium, or a dialkylmagnesium, or an organomagnesium derivative, with formulae corresponding to $R_2MgX$ or $R_2MgR_3$ or $R_2MgR_3 \cdot xAl(R_4)_3$ respectively, in which formulae X is a chlorine or bromine atom, $R_2$, $R_3$ and $R_4$ are identical or different alkyl groups comprising from 2 to 12 carbon atoms and x is a number in the range 0.01 to 1. The reaction between the tetravalent titanium compound and the organomagnesium compound is performed in the presence of a halogenating agent of the formula $R_5X$, in which X is a chlorine or bromine atom and $R_5$ is a hydrogen atom or alkyl group comprising from 2 to 12 carbon atoms, and optionally in the presence of an electron donor compound D, these various compounds being employed in molar ratios such that:

| | |
|---|---|
| $R_2MgX/TiX_{4-t}(OR_1)_t$ | is in the range 1.5 to 50, preferably 2 to 10, |
| $R_5X/R_2MgX$ | is in the range 1 to 2, and |
| $D/TiX_{4-t}(OR_1)_t$ | is in the range 0 to 0.5, preferably 0 to 0.2, |
| or such that: | |
| $R_2MgR_3/TiX_{4-t}(OR_1)_t$ | is in the range 1.5 to 50, preferably 2 to 10, |
| $R_5X/R_2MgR_3$ | is in the range 2 to 4, and |
| $D/TiX_{4-t}(OR_1)_t$ | is in the range 0 to 0.5, preferably 0 to 0.2 |
| or such that: | |
| $R_2MgR_3 \cdot xAl(R_4)_3 / TiX_{4-t}(OR_1)_t$ | is in the range 1.5 to 50, preferably 2 to 10, |
| $R_5X/R_2MgR_3 \cdot xAl(R_4)_3$ | is in the range $2(1 + 3x/2)$ to $4(1 + 3x/2)$, and |
| $D/TiX_{4-t}(OR_1)_t$ 0 to 0.2. | is in the range 0 to 0.5, preferably |

Equally the particulate solid material can be obtained by reacting magnesium metal with an alkyl halide in the presence of a halogenated transition metal compound taken at its maximum valency and optionally an electron donor compound D, complying with the same definition as above. Advantageously this reaction is performed by employing a quantity of magnesium metal such that the molar ratio of the quantity of magnesium metal to the quantity of halogenated transition metal compound is greater than 1, and a quantity of alkyl halide such after the reaction virtually no magnesium/carbon bonds are present in the product.

Preferably, the particulate solid material is obtained by reacting at between $-20°$ and $150°$ C., more especially between $50°$ and $100°$ C., magnesium metal with an alkyl halide of the formula $R_6X$ in which X is a chlorine or bromine atom and $R_6$ is an alkyl group comprising from 2 to 12 carbon atoms, and a halogenated compound of tetravalent titanium of the formula $TiX_{4-t}(OR_1)_t$, complying with the same definition as above, optionally in the presence of the electron donor compound D, chosen for example from among amines, amides, phosphines, sulphoxides, sulphones, ethers and thio-ethers. The reactants can be employed in molar ratios such that:

| | |
|---|---|
| $Mg/TiX_{4-t}(OR_1)_t$ | is in the range 1.5 to 20, preferably 2 to 10, |
| $R_6X/Mg$ | is in the range 0.5 to 8, preferably 1.5 to 5, and |
| $D/TiX_{4-t}(OR_1)_t$ | is in the range 0 and 0.5, preferably 0 to 0.2. |

The particulate solid material can be prepared, for example, by precipitating a halogenated transition metal compound on to solid particles consisting essentially of magnesium halide of the formula $MgX_2$ in which X is a chlorine or bromine atom. The precipitation is performed at a temperature between $-30°$ and $100°$ C. by reduction of a halogenated transition metal compound taken at its maximum valency by means of an organometallic compound of metals of Groups II or III of the Periodic Table of Elements.

Preferably a halogenated tetravalent titanium compound is used of the formula $TiX_{4-t}(OR_1)_t$ in which $R_1$, X and t comply with the same definitions as above, the reduction being performed by means of an organometallic compound chosen from amongst organomagnesium compounds of the formula $R_2MgR_3$ in which $R_2$ and $R_3$ comply with the same definitions as above, and organoaluminium compounds of the formula $Al(R_7)_{3-z}X_z$ in which $R_7$ is an alkyl group comprising from 2 to 12 carbon atoms, X is a chlorine or bromine atom and z is zero, integral or fractional in the rage 0 to 2. This reaction may optionally be performed in the presence of an electron donor compound D. The relative quantities of the various compounds employed (magnesium halide, halogenated tetravalent titanium compound, organomagnesium or organoaluminium compound, electron donor), can for example be in molar ratios such that: $MgX_2/TiX_{4-t}(OR_1)_t$ is in the range 1.5 to 10, preferably 2 to 5, $R_2MgR_3/TiX_{4-t}(OR_1)_t$ or $Al(R_7)_{3-z}X_z/TiX_{4-t}(OR_1)_t$ is less than 2, preferably between 0.5 and 1.5, and $D/TiX_{4-t}(OR_1)_t$ is in the range 0 to 1, preferably 0 to 0.5.

Catalysts employed in the stereospecific polymerisation of propylene or the copolymerisation of propylene with ethylene or other alpha-olefins, desirably have not only a satisfactory activity in polymerisation, but also a high stereospecificity. When it is desired to use the the catalyst of the present invention for this purpose, it is preferred to prepare the particulate solid material (which is subsequently treated with water to form the catalyst) by impregnating solid particles of magnesium chloride with titanium tetrachloride in the presence of an electron donor compound D. The preparation of such a particulate solid material may advantageously be carried out according to a process comprising the following two stages:

(a) treatment of the solid particles of magnesium chloride with an electron donor compound D chosen from in particular from amongst esters of aromatic acids or ethers derived from aromatic alcohols, (b) impregnation of the solid particles of magnesium chloride thus treated by means of titanium tetrachloride.

The quantity of electron donor compound D used during the first stage is generally in the range 0.06 to 0.2 mole of electron donor compound per mole of magnesium compound and the treatment temperature is preferably in the range 20° C. to 50° C.

In the second stage the solid particles of magnesium chloride are impregnated with titanium tetrachloride used in the pure state or in solution in a liquid hydrocarbon. One method consists in particular in crushing the solid particles of magnesium chloride in the presence of titanium tetrachloride. The quantity of titanium tetrachloride must be sufficient to be able to fix on these particles at least two gram atoms of titanium per 100 gram atoms of magnesium, the impregnation temperature lying in the range 80° C. to 150° C.

Prior to its use in polymerisation and in the absence of the co-catalyst, the particulate solid material is treated according to the present invention with water in a quantity such that the ratio of the number of moles of water to the number of gram atoms of transition metal present in the catalyst solid is in the range 0.1 to 5, preferably 0.2 to 2.

The particulate solid material, immediately prior to its treatment with water in accordance with the present invention, must be substantially free from compounds having a metal/carbon bond, such as a magnesium/carbon or aluminium/carbon bond. The maximum quantity of metal/carbon bonds that can be tolerated is such that the ratio of the number of metal/carbon bonds to the number of magnesium atoms is not greater than 0.1, preferably not greater than 0.01. Most preferably, the quantity of metal/carbon bonds, if any, is so small as to be undetectable by chemical analysis.

The quantity of water employed in the treatment is in the range 0.1 to 0.5 moles, preferably in the range 0.2 to 2 moles per gram atom of transition metal present in the particulate solid material.

The water employed according to the invention should preferably be free from impurities. For example, it is preferred to use water which has been de-ionised and de-oxygenated.

The treatment of the particulate solid may be performed using water in liquid form. For example, the solid can be placed in a closed chamber under pressure and a pre-determined quantity of water is introduced into the chamber so as to contact the solid; or a gas, for example nitrogen, containing a predetermined proportion of water vapour is passed over the solid. In these two cases it is preferred that the solid should be mechanically stirred or maintained in a fluidised state by means of a gas stream so as to distribute the water uniformly over the solid particles. Alternatively the particulate solid, can be suspended by agitation in a liquid hydrocarbon diluent throughout the period of contact with the water. The water may be added to the solid rapidly as single charge or in several portions distributed over a period of time. A preferred technique comprises introducing a fine spray of water into a suspension of the catalyst in a liquid hydrocarbon. Preferably the water is added slowly over a period of time between 5 and 240 minutes. Another method of carrying out this treatment consists in dispersing the particulate solid material in a liquid hydrocarbon diluent containing quantity of water within the defined limits and leaving the mixture to stand, or preferably keeping it stirred throughout the entire duration of the contact. However, any method can be employed, provided that it provides a uniform contact of the water with the particulate solid material.

The treatment of the particulate solid material with water may be performed at ambient temperature (20° C.), but the best results are obtained when the temperature is between 50° C. and 120° C. The duration of treatment is preferably between 5 minutes and 24 hours, most preferably between 10 minutes and 4 hours. After the treatment, the produced solid catalyst component is preferably washed one or more times by means of an inert liquid hydrocarbon, such as n-hexane or n-heptane, before being used as catalyst in the polymerisation of alpha-olefins.

In the case that any free water remains in the catalyst after the treatment has been carried out, it is desirable to eliminate such free water, for example by washing with liquid hydrocarbon or by evaporation under reduced pressure.

The co-catalyst used jointly with the treated catalyst comprises at least one organometallic compound of a metal belonging to Groups II or III of the Periodic Table, preferably an organoaluminium compound comprising at least one aluminium/carbon bond, such as a trialkyl aluminium, alkyl aluminium halide or alkyl aluminium alcoholate. Preferred, as co-catalyst are triethylaluminium, triisobutylaluminium, tri-n-hexylaluminium, tri-n-octylaluminium, diethylaluminium chloride, ethylaluminium sesquichloride and ethoxydiethyl aluminium.

The two ingredients of the catalytic system - the treated catalyst solid and the cocatalyst - may be brought into contact either prior to their introduction into the polymerisation medium, or within the said medium. The use of a catalyst solid treated according to the present invention makes it possible to attain a catalytic system having a high activity in the polymerisation of alpha olefins, but without unduly high initial catalytic activity. When the catalytic system is introduced into the polymerisation medium, the polymerisation reaction starts up immediately with a reduced activity for the first moments of the reaction, then after this initial phase it rapidly attains a high activity, the magnitude of which matches that of the catalytic solid which has not been treated by water. This catalytic system, having such an activity in the polymerisation, is suitable for polymerisation processes in suspension in a liquid hydrocarbon diluent, and more advantageously for processes of polymerisation in the gas phase, by means of reactors agitated mechanically and/or operated under fluidised bed conditions.

The catalyst treated in accordance with the process of the present invention can be used directly in commercial processes for polymerising or copolymerising alpha-olefins. When the process is carried out under gas-fluidised bed polymerisation conditions, it is desirable to introduce the catalyst in the form of particles having a mean diameter by mass greater than 50 microns, preferably between 80 and 400 microns, most preferably between 100 and 240 microns. Catalyst particles having a mean diameter by mass within the aforesaid ranges can be prepared by known methods, for example, by employing support materials having the desired particle size in the catalyst preparation. A preferred embodiment of the present invention comprises forming coated catalytically active particles or prepolymer particles of the desired particle size by contacting one or more alpha-olefins with the catalytic system comprising the treated catalyst particles and the organometallic co-catalyst.

A conversion of the catalytic system into the form of a coated catalytic system or prepolymer is preferably performed by bringing the catalyst and co-catalyst in contact with one or more alpha-olefins, in quantities such that the coated catalytic system or the prepolymer contains between 0.002 and 10 milligram atoms of transition metal per gram. The operation referred to as coating, is effected by polymerisation or copolymerisation of alpha-olefins, preferably in suspension in a liquid medium such as an aliphatic hydrocarbon. Generally speaking this operation may be continued until the coated catalyst system contains from 0.1 to 10 and preferably from 0.2 to 2 milligram atoms of transition metal per gram. The coated catalytic system can, for example, contain quantities of catalyst and co-catalyst such that the atomic ratio of the quantity of metal in the co-catalyst to the quantity of transition metal in the catalyst is comprised between 0.1 and 60, preferably comprised between 0.2 and 10 and especially comprised between 0.5 and 5.

The operation known as prepolymerisation, consisting in converting the catalytic system into a prepolymer, may be effected in two or more stages. When the prepolymer is made in one stage, the prepolymerisation is preformed as desired either in a suspension in a liquid medium or in the gas phase; generally, this stage may be continued, whilst preserving a suitable activity in the catalyst, until the prepolymer contains more than 0.002 and less than 0.1 and preferably more than 0.004 and less than 0.03 milligram atom of transition metal per gram. When the prepolymer is made in two stages, the first stage of the prepolymerisation is identical to the coating stage referred to above. The second stage of prepolymerisation may proceed as desired either in a suspension in a liquid medium or in the gas phase; generally, this stage may be continued, whilst preserving a suitable activity in the catalyst, until the prepolymer contains more than 0.002 and less than 0.1 and preferably more than 0.004 and less than 0.03 milligram atom of transition metal per gram.

The quantity of co-catalyst employed in the preparation of the coated catalyst system or prepolymer is preferably such that the atomic ratio of the quantity of metal in the co-catalyst to the quantity of transition metal in the catalyst is comprised between 0.1 and 60, and preferably comprised between 0.5 and 10.

As co-catalyst, organo-aluminium compounds are generally used, such as trialkylaluminium, or hydrides or alcoholates of alkylaluminium, or organo-zinc compounds.

Various known means may be employed to obtain prepolymer powders having, in particular, a particle size distribution suitable for use in gas-fluidised bed polymerisation. Processes involving selecting the desired particle size, such as screening, or granulometric fractionation by means of a gas stream or by means of a stream of liquid can be used if desired. These particle size selection operations can be performed either on the particles of prepolymer or catalyst, or where appropriate on the support used in the catalyst preparation. Such methods are preferably carried out under conditions such that the catalyst system present in the prepolymer powder does not lose its activity. In particular, the gases or liquids involved are preferably inert in relation to these catalyst systems.

It is preferable to employ, for the prepolymerisation, catalyst solids having a particle size distribution such that they directly produce prepolymer powder having the desired particle size. It is in fact important during the prepolymerisation operations to control the process so that the prepolymer particles develop in a regular way to the extent that they have shapes similar to the original catalyst particles, but on a larger scale. The result is that the prepolymer obtained has a suitable particle size distribution similar to that of the catalyst from which it originated, and that it is therefore directly ready for use.

The process of the present invention, provides polyolefins containing relatively small quantities of catalytic residue, generally less than 25 ppm of transition metals, in a gas-phase polymerisation process operating continuously or batchwise, under a pressure generally comprised between about 0.5 and 5 MPa and a temperature comprised between about 50° and 110° C. It is preferred to operate the polymerisation under conditions such that the content of catalytic residue is less than 20 ppm, and more preferably less than 15 ppm.

The process of the present invention can be used to manufacture polyolefins having a narrow molecular weight distribution, suitable for injection moulding, for example polymers or copolymers of ethylene or propylene having a molecular weight distribution between 2 and 6, more especially between 3 and 5, and polyolefins with a broad molecular weight distribution suitable for blow-moulding, for example polymers or copolymers of ethylene having a molecular weight distribution between 6 and 10.

The process of the invention has the effect of narrowing the particle size distribution of the polyolefins produced therefrom, and especially of diminishing the content of fine particles in these polyolefins.

The process is therefore especially useful in gas fluidised bed polymerisation, enabling the avoidance of excessive entrainment of polyolefin particles in the gas fluidisation stream to the exterior of the fluid bed.

Using the process of the invention, it is possible to produce under satisfactory industrial conditions a large variety of polymers and copolymers of alpha-olefins of reproducible quality, direct in the form of a powder containing low quantities of catalytic residues. The process is preferably used to make high-density polyethylenes (density over 0.940), for example homopolymers of ethylene and copolymers of ethylene and alpha-olefins comprising from 3 to 12 carbon atoms, linear low-density polyethylene (density less than 0.940), consisting of copolymers of ethylene and one or more alpha-olefins comprising from 3 to 12 carbon atoms, with a content by weight of units derived from ethylene of over 80%; elastomeric terpolymers of ethylene, propylene and dienes, elastomeric copolymers of ethylene and propylene, having a content by weight of units derived from ethylene comprised between about 30 and 70%, isotactic polypropylenes and copolymers of propylene and ethylene or other alpha-olefins, having a content by weight of units derived from propylene of over 90%, copolymers of propylene and 1-butene having a content by weight of units derived from 1-butene comprised between 10 and 40%.

The following non-restrictive Examples illustrate the present invention.

EXAMPLE 1

(a) Preparation of the solid particulate material (A)

Into a 5-liter stainless steel reaction, equipped with stirrer rotating at 750 revolutions per minute and a heating and cooling device, there were introduced in succession under an atmosphere of nitrogen at 20° C. 2 liter of n-hexane, 3.5 g of iodine and 38.8 g of magnesium in powder form. The reaction mixture was heated to 80° C. and 38.7 g of titanium tetrachloride and 67 g of n-propyl titanate were introduced rapidly, then 232 g of n-butyl chloride were added over 4 hours. At the end of this period the mixture was maintained for 2 hours with stirring at 80° C. and a solid particulate material (A) was obtained in suspension in n-hexane. Analysis of the solid (A) shows that it contained per gram atom of titanium :

0.9 gram atom of trivalent titanium,
0.1 gram atom of tetravalent titanium,
3.7 gram atoms of magnesium, and
8.5 gram atoms of chlorine, and that the composition of the solid (A) corresponded to the general formula:

$Mg_{3.7}Ti(OC_3H_7)_2Cl_{8.5}$ (b) Water treatment to give solid (B)

Into the suspension of solid (A) maintained with stirring at 80° C., there were slowly introduced under nitrogen over 30 minutes 3.7 g of distilled and de-gassed water. The molar ratio of the quantity of water to the quantity of titanium compound present in the catalytic solid was 0.5. At the end of this period the mixture was maintained for 1 hour with stirring at 80° C., then was finally cooled to ambient temperature (20° C.). The precipitate was then washed three times with n-hexane to give the treated catalyst solid (B).

(c) Polymerisation in suspension in n-hexane

Into a 3-liter stainless steel reactor, equipped with a stirrer rotating at 750 revolutions per minute and a heating and cooling device, there were introduced under an atmosphere of nitrogen 1.5 liter of n-hexane which was heated to 80° C. 3 millimoles of tri-n-octyl aluminium (TnOA) and a quantity of the treated catalyst solid (B) corresponding to 0.375 milligram atom of titanium were introduced with stirring. Hydrogen was introduced to give a partial pressure of 0.2 MPa and ethylene was passed in at 160 g/hr for 6 hours. It was noted that in the first moments of polymerisation, the activity of the catalytic system was approximately 1100 grams of ethylene per milligram atom of titanium per hour and per MPa of ethylene (g/mg·at·Ti×hr×MPa) and that after 15 minutes of polymerisation, the activity attained a maximum value of approximately 1400 g/mg·at·Ti×hr×Mpa. At the end of 6 hours of reaction, 960 g of polyethylene powder was collected which, after drying had the following characteristics:

titanium content:19 ppm;
melt index ($MI_5$) measured at 190° C. under 5 Kg load:5 g/10 minutes;
molecular weight distribution (Mw/Mn):3.8;
content by weight of fine particles with a diameter less than 160, 125 and 50 microns:4%, 2% and less than 0.1% respectively;
content by weight of large particles with a diameter equal to or greater than 630 microns:40%;
bulk density (BD):0.30 g/cm³.

The results are set out in Table 1.

EXAMPLE 2

(a) Preparation of prepolymer

Into a 5-liter stainless steel reactor equipped with a stirrer system rotating at 750 revolutions per minute and a heating and cooling device, there were introduced under nitrogen 3 liters of n-hexane which were heated to 70° C., 16.5 milliliters of a molar solution of tri-n-octylaluminium (TnOA) in n-hexane and a quantity of catalyst solid (B) prepared in accordance with the present invention as in Example 1, containing 12 milligram atoms of titanium. Hydrogen was added to a partial pressure of 0.05 MPa, then ethylene at a throughput of 160 g/hr for 3 hours. The prepolymer (C) which was obtained was dried under an atmosphere of nitrogen. It contained 0.025 milligram atom of titanium per gram.

(b) Copolymerisation in a fluidised bed

In a fluidised bed stainless steel reactor with a diameter of 90 cm, whose lower part contained a fluidisation grid, was circulated at 85° C. a rising gas stream propelled at a velocity of 50 cm/sec. and consisting of a reaction gas medium comprising hydrogen, ethylene, 1-butene and nitrogen, under the following partial pressures (pp):

pp hydrogen =0.123 MPa
pp ethylene =0.560 Mpa
pp 1-butene =0.224 MPa
pp nitrogen =0.690 Mpa 270 Kg of a charge powder were introduced into the reactor, followed by approximately 70 g of the prepolymer (C) the latter being introduced every 4 minutes. The charge powder was a copolymer of ethylene and 1-butene, with a density of 0.918, and was inert and anhydrous. After the production conditions had stabilised, the copolymer of ethylene and 1-butene was collected by sequenced withdrawal at the rate of approximately 96 kg/hr of copolymer powder, whilst maintaining the weight of the fluidised bed constant. In this way, under excellent production conditions there was obtained a copolymer powder having the following characteristics:

density (at 20° C.):0.918;
titanium content: 13 ppm;
melt index ($MI_{2.16}$), measured at 190° C. under a 2.16 Kg load :5 g/10 minutes;
molecular weight distribution (Mw/Mn):4.3;
bulk density (BD):0.33 g/cm³.

EXAMPLE 3 (Comparative)

(a) Preparation of the catalytic solid

This was carried out as in Example 1 (a). The suspension of solid particulate material (A) in hexane, was not contacted with water, but was cooled to ambient temperature (20° C.) and then washed 3 times n-hexane before being used.

(b) Polymerisation in Suspension in n-hexane

This was carried out as in Example 1 (c), except that instead of using the treated catalyst solid (B), the solid (A) was employed as catalyst. It was noted that in the initial stages of polymerisation, the activity of the catalytic system attained a maximum value of approximately 1800 g/mg·at·Ti×hr×MPa and that after 15 minutes of reaction, the activity stabilised at a value of about 1400 g/mg·at·Ti×hr×MPa. At the end of 6 hours of reaction, 960 g of polyethylene was recovered and dried. The produced white powder had a titanium content of 19 ppm.

The properties of this polyethylene powder are set out in Table 1. It was found that the solid (A) had a relatively high maximum activity in the initial stages of polymerisation. Moreover, the content by weight of fine particles of the polyethylene obtained was relatively high.

EXAMPLE 4 (Comparative)

(a) Preparation of Prepolymer

This was carried out as in Example 2 (a) except that instead of using the treated solid (B), the solid (A) prepared in Example 3 (comparative) was used. The prepolymer (D) obtained was dried under an atmosphere of nitrogen and contained 0.025 milligram atom of titanium per gram.

(b) Copolymerisation in a fluidised bed

This was carried out as in Example 2 c), except that instead of using prepolymer (C) the prepolymer (D) was used.

After a period of stabilisation of the copolymerisation conditions, it was found that copolymer agglomerates accumulated on the fluidisation grid and that a part of the fine particles of the copolymer was entrained outside the fluidised bed reactor and caused fouling of the recycling circuit of the reaction gas mixture. For this reason it became necessary to stop the polymerisation.

EXAMPLE 5

(a) Preparation of the particulate solid material (E)

Into a 5-liter stainless steel reaction, equipped with a stirrer rotating at 750 revolutions per minute and a heating and cooling device, there were introduced in succession under an atmosphere of nitrogen at 20° C. 2 liter of n-hexane, 3.5 g of iodine and 38.8 g of magnesium in powder form. The reaction mixture was heated to 80° C. and of titanium tetrachloride (77.5 g) was added rapidly.

232 g of n-butyl chloride was then added slowly over 4 hours. At the end of this period the mixture was maintained for 2 hours with stirring at 80° C. and the solid (E) in suspension in n-hexane was obtained. Analysis of the solid (E) showed that it contained per gram atom of titanium:

0.95 gram atom of trivalent titanium,
0.05 gram atom of tetravalent titanium,
3.8 gram atoms of magnesium and
10.6 gram atoms of chlorine.

The composition of the solid (E) corresponded to the general formula:

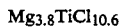
$Mg_{3.8}TiCl_{10.6}$ (b) Water treatment to give solid (F)

Into the suspension of the solid (E) maintained with stirring at 80° C., there was slowly introduced under nitrogen over 30 minutes 3.7 g of distilled and de-gassed water. The molar ratio of the quantity of water to the quantity of titanium compound present in the solid was 0.5. At the end of this time, the mixture was maintained for 1 hour with stirring at 80° C., and was finally cooled to ambient temperature (20° C.). The precipitate was then washed 3 times with n-hexane to give the treated catalyst solid (F).

(c) Polymerisation in suspension in n-hexane

This was performed as in Example 1 (c), except that the treated catalyst solid (F) was employed. It was noted that in the initial stages of polymerisation, the activity of the catalyst system was to approximately 1700 g/mg·at·Ti×hr×MPa and that after 15 minutes of polymerisation the activity attained a maximum value of approximately 2300 g/mg·at·Ti×hr×MPa. At the end of 6 hours of polymerisation 960 g of polyethylene was collected, which after drying, was in the form of a white powder, the characteristics of which are set out in Table 1.

EXAMPLE 6

(a) Preparation of the catalytic solid (G)

Example 5, steps (a) and (b) were repeated except that the quantity of water employed in step 5 (b) was 7.3 g (instead of 3.7 g). The molar ratio of the quantity of water to the quantity of titanium compound present in the produced solid (G) was 1.0.

(b) Polymerisation in suspension in n-hexane

Example 1 (c) was repeated except that the treated catalyst solid (G) was used (instead of solid B). It was noted that in the initial stages of polymerisation, the activity of the catalyst system was approximately 1600 g/mg·at·Ti×hr×MPa and that after 15 minutes of polymerisation, the activity reached a maximum value of approximately 2300 g/mg·at·Ti×hr×MPa. At the end of 6 hours, 960 g of polyethylene was collected which after drying was in the form of a white powder. The characteristics of this powder are set out in Table 1.

EXAMPLE 7

(a) Preparation of the catalytic solid (H)

Example 5, steps (a) and (b), were repeated except that the quantity of water employed in step 5(b) was 14.6 g (instead of 3.7 g). The molar ratio of the quantity of water to the quantity of titanium compound present in the catalytic solid was 2.0.

(b) Polymerisation in suspension in n-hexane

This was carried out as in Example 1 (c) except that the treated catalyst solid (H) was employed. It was noted that in the initial stages of polymerisation, the activity of the catalyst system was about 1400 g/mg·at·Ti×hr×MPa, and that after 15 minutes of polymerisation, the activity attained a maximum value of approximately 2200 g/mg·at·Ti×hr×MPa. At the end of 6 hours of reaction, 960 g of polyethylene were collected. The dried white powder had the characteristics set out in Table 1.

EXAMPLE 8 (Comparative)

(a) Preparation of the particulate solid material (E)

Example 5, step (a), was repeated. The suspension in hexane was cooled to ambient temperature (20° C.) and the solid (E) was washed 3 times with n-hexane.

(b) Polymerisation in suspension in n-hexane

This was carried out as in Example 1 (c) using the solid (E) instead of (B). It was noted that in the initial stages of polymerisation, the activity of the catalyst system attained a maximum value of approximately 2700 g/mg·at·Ti×hr×MPA and that after 15 minutes of reaction, the activity stabilised around a value of approximately 2300 g/mg·at·Ti×hr×MPa. At the end of 6 hours of reaction, 960 g of polyethylene was collected. The characteristics are set out in Table 1.

The catalyst solid (E) had a maximum activity which was relatively high during the first moments of polymerisation. Moreover, the content by weight of fine particles of the produced polyethylene was comparatively high.

EXAMPLE 9

(a) Preparation of prepolymer

Into a 5-liter stainless steel reactor equipped with a stirrer rotating at 750 revolutions per minute and a heating and cooling device, there were introduced under nitrogen 3 liters of n-hexane which were heated to 50° C., 4.8 milliliters of a molar solution of tri-n-octylaluminium (TnOA) in n-hexane and a quantity of the treated catalyst solid (G) prepared in Example 6, containing 6 milligram atoms of titanium. Hydrogen was added to a partial pressure of 0.05 MPa, then ethylene at a throughput of 160 g/hr for 3 hours. The prepolymer (I) obtained was then dried under an atmosphere of nitrogen. It contained 0.0125 milligram atom of titanium per gram.

(b) Copolymerisation in a fluidised bed

In a fluidised bed stainless steel reactor, 90 cm in diameter, provided in its lower part with a fluidisation grid, there was circulated at 85° C. a rising gas stream propelled at a velocity of 50 cm/sec and consisting of a reaction gas mixture comprising hydrogen, ethylene, 1-butene and nitrogen, under the following partial pressures (pp):

pp hydrogen = 0.80 MPa
pp ethylene = 0.80 MPa
pp 1-butene = 0.04 MPa
pp nitrogen = 0.46 Mpa Charge powder (270 kg of copolymer powder of ethylene and 1-butene, with a density equal to 0.955, which was inert and anhydrous), was introduced, followed by, in sequence, approximately 70 g of the prepolymer (I) every 2.4 minutes.

After a period of stabilisation of the polymerisation conditions approximately 80 kg/hr of copolymer powder were collected by sequenced withdrawal whilst maintaining the fluidised bed weight constant. In this way, under excellent production conditions, a copolymer powder having the following characteristics was obtained:

density (at 20° C.): 0.953;
titanium content: 13 ppm;
melt index (MI$_{2.16}$), measured at 190° C. under a 2.16 kg load: 1.6 g/10 minutes;
molecular weight distribution (Mw/Mn): 6.5
bulk density (BD): 0.35 g/cm$_3$.

EXAMPLE 10 (Comparative)

(a) Preparation of a prepolymer

Example 9 (a) was repeated except that instead of using the treated catalyst solid (G), the catalytic solid (E) prepared in Example 8 (comparative) was employed. The prepolymer (J) obtained was dried under an atmosphere of nitrogen and contained 0.0125 milligram atom of titanium per gram.

(b) Copolymerisation in a fluidised bed

The copolymerisation was carried out as in Example 9 (b), except that instead of using prepolymer (I), prepolymer (J) was employed.

After a period of stabilisation of the copolymerisation conditions, it was found that copolymer agglomerates very rapidly accumulated on the fluidisation grid and that a portion of fine particles of copolymer was entrained outside the fluidised bed reactor causing fouling of the recycling circuit of the reaction gas mixture, and necessitating stopping the reaction.

EXAMPLE 11

(a) Preparation of the solid particulate material n-Butylmagnesium chloride was prepared in a stainless steel 5-liter reactor equipped with a mechanical stirrer, a reflux condenser and a device for heating or cooling by circulation of fluid in a double jacket. The following reagents were introduced into the reactor under an atmosphere of nitrogen and at ambient temperature (20° C.):

21.9 g (900 m.Moles) of magnesium in powder form
600 ml of n-hexane .
83.3 g (900 m.Moles) of n-butylchloride
a crystal of iodine The reaction medium was heated to 75° C. The reaction proceeded under these conditions for 2 hours. In this way a suspension of 900 m.Moles of n-butylmagnesium chloride in n-hexane were obtained.

Still under an atmosphere of nitrogen, the suspension of n-butylmagnesium chloride was heated to 75° C. and a solution of 57 g (300 m.Moles) of titanium tetrachloride and 83.3 g (900 m/Moles) of n-butylchloride in 350 ml of n-hexane were gradually introduced over a period of 2 hours. The reaction medium was maintained at 75° C. with stirring for 1 hour, and the solid (K) was obtained in suspension in n-hexane. Analysis of the solid (K) showed that it contained per gram atom of titanium:

0.95 gram atom of trivalent titanium,
0.05 gram atom of tetravalent titanium,
4.3 gram atoms of magnesium, and
12.0 gram atoms of chlorine, The composition of the solid (K) corresponded to the general formula

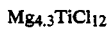

Mg$_{4.3}$TiCl$_{12}$

(b) Water treatment to give catalyst solid (L)

To the suspension of the solid (K) maintained with stirring at 75° C., was slowly introduced under nitrogen over 30 minutes 5.4 g of distilled and degassed water. This means that the molar ratio of the quantity of water to the quantity of titanium compound present in the solid is 1.0. At the end of this period, the mixture was maintained for 1 hour with stirring at 75° C., and then was finally cooled to ambient temperature (20° C.). The precipitate was then washed 3 times with n-hexane to give the treated catalyst solid (L).

(c) Polymerisation in suspension in n-hexane

The polymerisation was carried out as in Example 1 (c), except that instead of using the treated catalyst solid (B), the treated catalyst solid (L) was employed. It was noted that in the initial stages of polymerisation, the activity of the catalyst system was approximately 1800 g/mg·at·Ti×hr×MPa, and that after 15 minutes of polymerisation the activity attained a maximum of approximately 2400 g/mg·at·Ti×hr×MPa. At the end of 6 hours of reaction, approximately 960 g of polyethylene were obtained. The characteristics of which are set out in Table 1.

EXAMPLE 12 (Comparative)

(a) Preparation of the solid particulate material

The hexane suspension of the particulate solid (K) prepared as shown in Example 11(a) was cooled to ambient temperature (20° C.) and washed 3 times with n-hexane before being used as described below.

(b) Polymerisation in n-hexane

This was carried out as described in Example 1 (b), except that the solid (K) was employed (instead of (B)). It was noted that in the initial stages of polymerisation, the activity of the catalyst system attained a maximum value of approximately 2900 g/mg·at·Ti×hr×MPa, and that after 15 minutes of reaction the activity stabilised at approximately 2500 g/mg·at·Ti×hr×MPa. At the end of 6 hours of reaction, approximately 960 g of polyethylene were obtained. This was dried to form a white powder. The characteristics are set out in Table 1.

It is observed that the catalyst solid (K) has a relatively high maximum activity in the first moments of polymerisation. Moreover, the contents by weight of fine particles in the polyethylene obtained are particularly high.

with from 0.1 to 5 moles of water per gram atom of titanium and/or vanadium present in the catalyst.

2. Process according to claim 1, characterised in that the quantity of water used is such that the ratio of the number of moles of water to the number of gram atoms of transition metal present in the catalyst is from 0.2 to 2.

3. Process according to claim 1, characterised in that the treatment of the solid with water is performed at a temperature between 50° C. and 120° C., during a period, of from 5 minutes to 24 hours.

4. Process according to claim 1, characterised in that the particulate solid material used in the treatment with water corresponds to the general formula:

$$Mg_mAl_nM(OR_1)_pX_qD_r$$

in which M is an atom of titanium and/or vanadium, $R_1$ is an alkyl group comprising 2 to 14 carbon atoms, X is an atom of chlorine and /or bromine, D is an electron donor compound comprising at least 1 atom of oxygen, sulphur, nitrogen or phosphorus, but not comprising and atom of active hydrogen, and wherein:
m is from 1.5 to 50,
n is from 0 to 2,
p is from 0 tp 3,
q is from 4 to 110,
r is from 0 to 60.

5. A process as claimed in claim 4 wherein:
m is from 2 to 10
n is from 0 to 1
q is from 5 to 27, and
r is from 0 to 20.

6. Process according to claim 1 wherein the water treatment is carried out by forming a suspension of the particulate solid material in a liquid hydrocarbon diluent and gradually adding the water.

7. A process as claimed in claim 6 wherein the water

TABLE 1

| Example | H₂O/Ti (moles/ g · at) | Initial activity* | Activity after 15 minutes* | MI₅ (g/10 min) | Mw/Mn | Particle size analysis; % by weight of particles | | | | BD g/cm³ |
|---|---|---|---|---|---|---|---|---|---|---|
| | | | | | | less than 160 microns | less than 125 microns | less than 50 microns | not less than 630 microns | |
| 1 | 0.5 | 1100 | 1400 | 5 | 3.8 | 4 | 2 | <0.1 | 40 | 0.30 |
| 3 comparative | 0 | 1600 | 1400 | 6 | 3.9 | 13 | 9 | 1.5 | 29 | 0.33 |
| 5 | 0.5 | 1700 | 2300 | 1.5 | 7.2 | 5 | 2.5 | <0.1 | 34 | 0.31 |
| 6 | 1.0 | 1600 | 2300 | 1.4 | 7.1 | 3 | 1.7 | <0.1 | 36 | 0.30 |
| 7 | 2.0 | 1400 | 2200 | 1.1 | 7.3 | 2.5 | 1.5 | <0.1 | 41 | 0.29 |
| 8 comparative | 0 | 2700 | 2300 | 2.0 | 7.2 | 12 | 8 | 1.8 | 28 | 0.34 |
| 11 | 1.0 | 1800 | 2400 | 1.2 | 7.5 | 6 | 2.5 | 0.1 | 25 | 0.36 |
| 12 | | | 2500 | 1.6 | 7.4 | 18 | 11 | 2.5 | 18 | 0.39 |
| comparative | 0 | 2900 | | | | | | | | |

*activity expressed in g/mg · at · Ti × hr × MPA.

I claim:

1. A process for polymerising ethylene or propylene, or copolymerising ethylene with alpha-olefins comprising from 3 to 12 carbons, or propylene with ethylene and/or 1-butene, in suspension in a liquid hydrocarbon diluent or in a gas phase, under a pressure from 0.5 to 5 MPa and at a temperature from 50° C. to 110° C., in the presence of a Ziegler-Natta catalytic system comprising, as catalyst, a particulate solid material based on magnesium, chlorine, titanium and/or vanadium prepared under substantially anhydrous conditions and being substantially free from metal/carbon chemical bonds, and as co-catalyst, at least one organoaluminium compound characterised in that prior to contacting the catalyst with the co-catalyst to form the catalytically active system, the particulate solid material is treated is added as a fine spray.

8. Process according to claim 1 characterised in that the Ziegler-Natta catalyst system comprising the water-treated catalyst particles and the co-catalyst is converted into prepolymer by contacting with one or more alpha-olefins, and that the produced prepolymer is employed as a catalyst in the gas-fluidised bed polymerisation or copolymerisation of one or more alpha-olefins.

9. Process according to claim 1, characterised in that the polymerisation or copolymerisation of alpha-olefins is performed in the gas phase, by means of a reactor stirred mechanically and/or operating under fluidised bed conditions at a pressure between 0.5 and 5 MPa and at a temperature comprised between 50° C. and 110° C.

* * * * *

UNITED STATES PATENT AND TRADEMARK OFFICE
CERTIFICATE OF CORRECTION

PATENT NO. : 4,894,424

DATED : January 16, 1990

INVENTOR(S) : Dominique Lassalle

It is certified that error appears in the above-identified patent and that said Letters Patent is hereby corrected as shown below:

Col. 5, line 60, "0 to 0.2." should appear under the right hand column of the tabulation Col. 11, line 14, should read "liters"

Col. 13, line 44, should read "liters"

Claim 4, line 23, change "and" to --an--(first occurrence)

Claim 4, line 26, change "tp" to --to--

Signed and Sealed this

Twenty-sixth Day of March, 1991

Attest:

HARRY F. MANBECK, JR.

*Attesting Officer*      *Commissioner of Patents and Trademarks*